United States Patent Office 3,534,906
Patented Oct. 20, 1970

3,534,906
CONTROL OF ATMOSPHERIC PARTICLES
Jay Don Gensler, Alexandria, Va., assignor to The Dow Chemical Company, Midland, Mich., a corporation of Delaware
No Drawing. Filed Nov. 20, 1967, Ser. No. 684,550
Int. Cl. A01g 15/00
U.S. Cl. 239—2                                    9 Claims

ABSTRACT OF THE DISCLOSURE

A process for producing coalescence and precipitation of particles suspended in the atmosphere such as fog, smoke, clouds, and the like by contacting such particle-containing atmosphere with a polyelectrolyte in fine particulate form. The polyelectrolyte disrupts the electrical equilibrium within the suspended particulate mass and thereby produces the desired coalescence and precipitation of atmospheric particles.

---

This invention relates to a method for the control of atmospheric moisture and more particularly relates to a method for fog abatement and the modification of clouds.

In the past, many methods have been proposed to modify clouds to produce rain or snow, to dissipate haze or fog, to modify and decrease the intensity of tropical storms or hurricanes, or to remove smoke, smog and the like from the air. Most of the reported work in the area deals with cloud modification and many materials have been employed with varying degrees of success. In general, to produce rain from a cloud by seeding, it is necessary to employ an ice-former such as silver iodide or Dry Ice or a hygroscopic material such as NaCl, $CaCl_2$, $MgCl_2$ and the like. Usually such seeding materials depend on a temperature within the cloud of less than 0° C. so that ice crystals form and grow. Many low clouds, fogs and the like are too warm, however, and such seeding materials are not effective. Attempts have been made to produce rain from low warm clouds and fog by employing hygroscopic materials or sprays of water thereto to effect coalescence and precipitation of the particles within the cloud. While rain has at times been produced by this method, such rainfall will not propagate itself unless the cloud was already in a metastable condition. Another problem presented in present systems is that very thick layers of cloud or fog, e.g., 5000 ft., are normally required to achieve good nucleation, coagulation and precipitation. Therefore, while a process to reliably control the agglomeration of atmospheric particles is greatly desired, no method has been heretofore provided which is effective in producing the agglomeration and subsequent precipitation of particles suspended in the air, particularly when such particles are above the freezing point.

It is an object of this invention to provide a means for controlling atmospheric particles by producing agglomeration and precipitation thereof. A further object is to provide a means whereby fog may be quickly and safely abated. A still further object is to provide an improved method for the modification of clouds to alter their physical form and moisture content. A still further object is to provide a method whereby smoke, smog and the like may be substantially removed from the air thereby diminishing air pollution. These and other objects and advantages of the present invention will become obvious from a reading of the following detailed description.

In accordance with the process of this invention, a polyelectrolyte in fine particulate form is contacted with the fog, smoke, cloud or other atmospheric mass of particles to be modified. The presence of the polyelectrolyte enables the water droplets or other particles in the fog, cloud or atmosphere to coalesce by altering the electrostatic charge on such droplets. Such coalescence is therefore produced without dependence on the surrounding temperature thereof being below the freezing point of water.

Suitable polyelectrolytes for use in the process of this invention may be cationic, anionic, nonionic or amphoteric, hydrophobic or hydrophylic and include polyalkylenimines such as polyethylenimine or polypropylenimine, polyalkylenepolyamines such as the condensation polymers of diethylenetriamine and dihaloalkanes, sodium polystyrene sulfonate, copolymers of sodium acrylate and acrylamide, partially hydrolyzed, crosslinked, polyacrylamides such as are defined in U.S. Pat. 3,247,171, ion exchange resins such as a condensation product of epichlorohydrin and ammonia, polyalkylene oxides, copolymers of alkylene oxides with other organic electrolytes, and the like. In order to possess the necessary properties for use in the process of this invention, the organic polyelectrolytes must have a molecular weight of at least 30,000 and preferably of at least 50,000. Such polyelectrolytes may be employed either in aqueous solution, spray or mist form or in the form of a finely-divided particulate solid. In general, the most effective size of the particles of polyelectrolyte or polyelectrolyte solution is from about 10 microns to about 50 mesh (Standard sieve size). Particles smaller than 10 microns lose effectiveness in producing coalescence of the atmospheric particles and particles larger than 50 mesh, while effective, begin to significantly reduce the number of particles produced from a given volume of polyelectrolyte and therefore become inefficient.

Since the coagulation and precipitation of the water particles herein is electrostatically produced, it is necessary that at least a portion of the polyelectrolyte employed contains a different charge from that of the fog or cloud to be treated. Therefore, since clouds and fogs usually have an electronegative charge, it is often desirable to employ a cationic electrolyte, or where the fog, cloud, or other particulate mass to be coagulated and dispersed contains a positive charge, an anionic polyelectrolyte may be employed. However, aggregation and precipitation of particles is also accomplished by the addition of a polyelectrolyte of similar charge but of different magnitude and which, therefore, disrupts the electrostatic equilibrium.

The amount of polyelectrolyte or polyelectrolyte solution required for a given atmospheric condition will vary depending upon the density of the atmospheric particles, e.g., the density of the cloud or fog, the depth of the mass of atmospheric particles through which it is to pass, and the like. As each polyelectrolyte particle passes through the mass of atmospheric particles, differently charged particles combine to form a particle of altered electrical charge which falls through the atmospheric mass, collides with other particles to produce a large particle and continues to increase in acceleration and speed until the surface tension is overcome and the particle redivides. Each of the divided particles then continues to fall and grow to produce a "chain-reaction" of acceleration and division of particles.

Any suitable means may be employer to distribute the polyelectrolyte within the fog, smoke, cloud, or other particle-containing atmospheric mass and thereby produce contact between the dissimilar particles, i.e., the atmospheric particles and the polyelectrolyte particles. For example, spraying a solution of the polyelectrolyte above or within the fog or cloud from an airplane or helicopter, explosively dissiminating the polyelectrolyte within the cloud by means of a bomb or exploding rocket, spraying or blowing the polyelectrolyte from ground vehicles, and the like, produces sufficient dispersion to cause coalescence and precipitation of the particles and thereby produce dissipation of fog or smoke and rain, snow or other precipitation from clouds.

The following examples are provided to more fully illustrate the invention but are not to be construed as limiting to the scope thereof.

EXAMPLE 1

Steam was injected into a room 20 ft. x 12 ft. x 8 ft. until a dense fog was produced. The degree of fog density was measured by shining a light a distance of 16 feet through the fog and into a light intensity meter such that higher readings are produced on the light intensity with less dense fog and lower readings with more dense fog. A reading of 120 units is achieved when no fog is present.

When the light intensity meter reading stabilized at 18 units, a 10 weight percent aqueous solution of polyethylenimine (having a molecular weight of about 100,000) was sprayed as a fine mist about 4 feet above the beam of light for 10 seconds at the rate of 1 gm. of spray per second. The spray was produced from a Quick-Fill spray bomb powered by $CO_2$ cartridges which was moved back and forth between the light source and the light meter. Within 30 seconds after spraying was started, the light intensity meter showed a reading of 21 units and continued to show a reading of 21 units for a total of two minutes. After a total of five minutes, the fog had returned to the equilibrium value of 18 units. It should be noted that the substantial reduction in fog is produced with an effective particle fall distance of only four feet.

In a control run, a spray of water was employed in place of the spray of polyethylenimine solution. During the ten second period of spraying, the light intensity meter reading decreased to 16 units and remained at this level for about 45 seconds. After a total time of about five minutes from the beginning of the water spraying, the light intensity meter reading returned to the equilibrium value of 18 units.

EXAMPLE 2

In the same manner as Example 1, a 5 weight percent solution of polyethylenpolyamine (Purifloc C–31) having a molecular weight of about 100,000 was sprayed four feet above the beam of light for a period of five seconds at a rate of one gram of spray per second. After 30 seconds from the beginning of application of the spray, the light intensity meter reading had increased to 20 units and remained at this value for a period of one minute. After a total of three minutes, the intensity meter reading had returned to the equilibrium value of 18 units.

EXAMPLE 3

In the manner of Example 1, a 10 weight percent aqueous solution of polyethylenimine having a molecular weight of about 100,000 was sprayed for two minutes along a line four feet above the light beam. During this period the light intensity meter reading rose to a value of 24 units and an additional three minutes was required for the reading to return to the equilibrium value of 18.

When a five weight percent solution of polyethylenepolyamine having a molecular weight of about 100,000 was employed in the same manner, the light intensity meter reading increased to a value of 22 units and an additional two and one-half minutes was required for the reading to return to an equilibrium value of 18 units.

Similar results are obtained when a fine (about 200 mesh) powdered form of a water-swellable, partially hydrolyzed acrylamide polymer containing about 30% by weight sodium acrylate groups and crosslinked with about 1500 p.p.m. of methylene bisacrylamide is dispersed into the steam in the place of the polyethylenimine or polyalkylenepolyamine.

Likewise, similar results are obtained when a finely divided form of sodium polystyrene sulfonate is employed in the place of the polyethylenimine employed above.

In a control experiment employing water in the place of an aqueous solution of polyethylenimine of polyalkylenepolyamine, the light intensity meter reading decreased to 15 units during the spraying step then increased slowly to the equilibrium value of 18 units in about three minutes.

EXAMPLE 4

In order to demonstrate the applicability of the process of this invention to disperse a warm fog from airport runways under actual field conditions, an experiment was conducted at a large airport in the southern United States. For purposes of the test both a transmissometer and ground observers were employed to determine the effect of the test on visibility. The test was begun at 7:05 a.m. with an initial visibility of 80 feet to 100 feet with no runway lights visible to the observers. An aircraft was flown over one runway at an altitude of about 500 feet and a 5% solution of polyethylenimine having a molecular weight of about 100,000 was applied at the rate of 200 lbs./sq. mile in seven passes over the runway. Both transmissometer readings and ground visual observers recorded that visibility rapidly increased with each pass of the spraying operation and by 8:00 a.m. after six of the seven passes had been completed, visibility had increase to 3200 feet.

EXAMPLE 5

A heavily forested area covered by a large cloud of ascending white-grey smoke from burning saw mill waste was treated with a 5 weight percent aqueous solution of polyethylenimine by spraying a mist of such solution from an airplane just above the smoke (an altitude of about 100 feet). As the polyelectrolyte solution passed into the smoke a definite color change to blue was observed, showing densification of the smake and the color change and densification could be seen continuing down through the rising smoke. After a second application of polyelectrolyte, the forest could be seen through the treated portion of the smoke but was not visibile through the untreated portions.

In a like manner, spraying from aircraft into moisture-laden cloud columns of several thousand feet in height with aqueous solutions containing 1 to 10 weight percent polyethylenimine and using a deployment rate of from about 5.0 to 20.0 lbs. of solution per square mile near the top of the clouds results in precipitation of a substantial portion of such clouds in the form of rain. Similar results are achieved when other polyalkylenimines, polyalkylenepolyamines, copolymers of sodium acrylate and acrylamide are employed in place of the polyethylenimine.

Various modifications can be made in the present invention without departing from the spirit or scope thereof for it is understood that I limit my self only as defined in the appended claims.

I claim:

1. A process for the control of particles suspended in the atmosphere which comprises contacting a mass of suspended atmospheric particles with an organic polyelectrolyte having a molecular weight of at least 30,000 in fine particulate form to modify the electrical charge of said atmospheric particles thereby to produce coalescence and precipitation of such particles.

2. The process according to claim 1 wherein the size of the polyelectrolyte particles is between about 10 microns and about 50 mesh.

3. The process according to claim 1 wherein the molecular weight of the polyelectrolyte is at least 50,000.

4. The process according to claim 1 wherein the polyelectrolyte is a polyalkylenimine.

5. The process according to claim 1 wherein the polyelectrolyte is a polyalkylenimine.

6. The process according to claim 1 wherein the polyelectrolyte is a lightly crosslinked water swellable polymer of acrylamide which has been hydrolyzed so as to contain about 30% by weight sodium acrylate groups.

7. The process according to claim 1 wherein the polyelectrolyte is a polyethylenimine.

8. The process according to claim 1 wherein the polyelectrolyte is a polyethylenepolyamine.

9. The process of claim 1 wherein the polyelectrolyte is a sodium polystyrene sulfonate.

References Cited

UNITED STATES PATENTS

| 2,835,530 | 5/1958 | Schneider | 239—2 |
| 2,962,450 | 11/1960 | Elöd et al. | 239—14 X |

ROBERT B. REEVES, Primary Examiner

U.S. Cl. X.R.

252—305